US009043560B2

(12) United States Patent
Pruthi (10) Patent No.: US 9,043,560 B2
(45) Date of Patent: May 26, 2015

(54) DISTRIBUTED CACHE COHERENCY PROTOCOL

(75) Inventor: Arvind Pruthi, Los Gatos, CA (US)

(73) Assignee: Toshiba Corporation, Tokyo (JP)

( * ) Notice: Subject to any disclaimer, the term of this patent is extended or adjusted under 35 U.S.C. 154(b) by 864 days.

(21) Appl. No.: 13/242,621

(22) Filed: Sep. 23, 2011

(65) Prior Publication Data

US 2012/0089786 A1 Apr. 12, 2012

Related U.S. Application Data (60) Provisional application No. 61/390,588, filed on Oct. 6, 2010.

(51) Int. Cl.
*G06F 12/08* (2006.01)

(52) U.S. Cl.
CPC ........ *G06F 12/0888* (2013.01); *G06F 12/0831* (2013.01); *G06F 12/0842* (2013.01)

(58) Field of Classification Search
CPC ............ G06F 11/2082; G06F 11/2064; G06F 11/1451; G06F 711/141; G06F 2201/82; G06F 2201/84; G06F 17/30215; G06F 17/30578; G06F 12/08
See application file for complete search history.

(56) References Cited

U.S. PATENT DOCUMENTS

| 7,552,122 | B1 | 6/2009 | Georgiev |
| 7,694,065 | B2* | 4/2010 | Petev et al. ................. 711/6 |
| 2005/0172080 | A1* | 8/2005 | Miyauchi .................. 711/136 |
| 2010/0070725 | A1* | 3/2010 | Prahlad et al. ............ 711/162 |
| 2010/0241807 | A1* | 9/2010 | Wu et al. ................... 711/118 |
| 2011/0004732 | A1* | 1/2011 | Krakirian et al. ......... 711/147 |

OTHER PUBLICATIONS

US Patent and Trademark Office (USPTO), Office Action issued in co-pending U.S. Appl. No. 13/278,453, filed Oct. 21, 2011, having a Notification Date of Jun. 18, 2013 (12pgs).
Patent Cooperation Treaty (PCT) International Search Report and Written Opinion in co-pending Application No. PCT/US2011/052961 (International Filing Date Sep. 23, 2011), having a date of mailing of Feb. 16, 2012 (9 pgs).

* cited by examiner

*Primary Examiner* — Jared Rutz
*Assistant Examiner* — Jean Edouard
(74) *Attorney, Agent, or Firm* — White & Case LLP (57) ABSTRACT

Systems, methods, and other embodiments associated with a distributed cache coherency protocol are described. According to one embodiment, a method includes receiving a request from a requester for access to one or more memory blocks in a block storage device that is shared by at least two physical computing machines and determining if a caching right to any of the one or more memory blocks has been granted to a different requester. If the caching right has not been granted to the different requester, access is granted to the one or more memory blocks to the requester.

21 Claims, 7 Drawing Sheets

Figure 7

DISTRIBUTED CACHE COHERENCY PROTOCOL

CROSS REFERENCE TO RELATED APPLICATIONS

This present disclosure claims the benefit of U.S. provisional application Ser. No. 61/390,588 filed on Oct. 6, 2010, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Storage Area Networks (SANs) provide a large amount of storage capacity that can be shared by numerous computing machines. The machines typically communicate with a SAN using the SCSI protocol by way of the internet (iSCSI) or a fibre channel connection. Often, the machine will include a SCSI interface card or controller that controls the flow of data between the machine and the SAN. To the machine, the SAN will appear as though it is locally connected to the operating system. Because all of the machines have access to the shared memory in the SAN, caching on the individual machines is often disabled to avoid difficulties in maintaining coherency among the caches on the various machines.

SUMMARY

In one embodiment an apparatus includes non-transitory storage media configured as a cache associated with a physical computing machine that shares access to a block storage device with at least one other physical computing machine. The apparatus also includes a caching logic associated with the physical computing machine. The caching logic is configured to cache data in the cache. The caching logic caches data stored in a delegated range of memory blocks and does not cache data stored outside of the delegated range of memory blocks. The apparatus also includes a block delegation logic configured to assign a caching right for the delegated range of memory blocks in the block storage device to the caching logic. The caching right is an exclusive right granted to the caching logic.

In another embodiment, a method includes receiving a request from a requester for access to one or more memory blocks in a block storage device that is shared by at least two physical computing machines and determining if a caching right to any of the one or more memory blocks has been granted to a different requester. If the caching right has not been granted to the different requester, access is granted to the one or more memory blocks to the requester.

In another embodiment, a block memory interface configured for coupling to a physical computing machine is provided. The block memory interface is further configured to receive, from the physical machine, a request for access to data stored in a block memory device accessible to at least one other physical computing machine; determine if a caching right to a range of memory blocks that includes the requested one or more memory blocks has been assigned to the block memory interface; if the caching right has been assigned to the block memory interface, provide access to the data in a cache. The caching right is an exclusive right for the physical computing machine to cache a range of memory blocks in the block memory device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

As CPU capabilities increase, the use of virtual machines has become widespread. Operating systems like Vmware and Windows Hyper-V allow a single physical machine to run multiple instances of an operating system that each behave as a completely independent machine. A virtual machine's operating system instance accesses a virtual "disk" in the form of a file that is often stored in a SAN. Storing a virtual machine's virtual disk file on the SAN allows a virtual machine to be moved seamlessly between physical machines. As long as the SAN is accessible by two or more physical machines, the virtual machine can be moved between the machines.

Accessing the SAN typically involves a high latency, making local caching of a virtual machines' virtual disk file on the host physical machine an appealing option. However, as discussed in the background, cache coherence is an issue with multiple physical machines accessing the same SAN. If a virtual machine moves from one physical machine (A) to another (B), the cache on the machine A for the virtual machine needs to be invalidated before B can start caching data from the moved virtual machine. The case is even more complicated with the storage used by the virtual machine is in the form of a file on top of a block device (SAN), eg., vmdk files on vmfs. (In such cases, the block device is typically formatted with a cluster-aware file system such as vmfs). The physical machine's cache which typically operates on top of the block layer has no way of identifying which blocks are associated with any given virtual machine's file and as such cannot identify which blocks should be invalidated.

Described herein are example systems, methods, and other embodiments associated with a distributed cache coherency protocol. Using the coherency protocol, computing machines that share access to a block storage device can perform local caching while dynamically resolving cache coherency issues. The coherency protocol allows the block storage device and individual computing machines to collaborate to facilitate cache coherency amongst the computing machines.

Using the distributed cache coherency protocol, exclusive caching rights to a range of memory blocks in the block storage device are delegated to a computing machine that accesses the memory blocks. The computing machines do not cache memory blocks unless a caching right has been granted to the machine with respect to those memory blocks. In this manner, a centralized block delegation logic determines which memory blocks in the block storage device should be cached by a given computing machine and grants a caching right for those blocks. The block delegation logic also controls access by a given computing machine to memory blocks that are being cached by another computing machine.

Because virtual machines tend to access a dedicated block of storage that functions as the virtual disk for the virtual machine, virtual machines do not typically access blocks of storage that have been allocated to other virtual machines. This makes the distributed cache coherency protocol described herein well suited for use in a virtual machine environment because it facilitates caching of a virtual machine's virtual disk file on the host machine while allowing the virtual machine to be moved seamlessly to another host machine.

Figure 1:
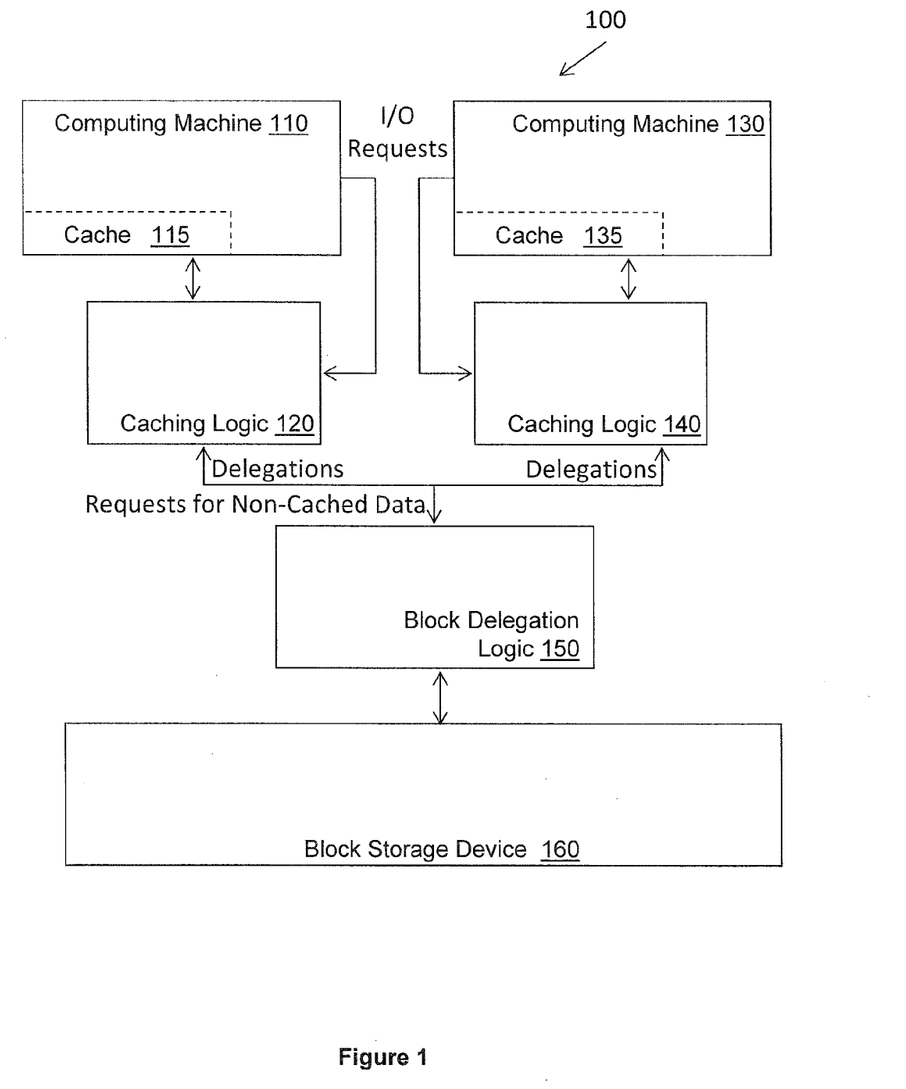
FIG. 1 illustrates one embodiment of a system associated with a distributed cache coherency protocol apparatus.

With reference to FIG. 1, one embodiment of a system 100 is shown that is associated with a distributed cache coherency protocol. The system 100 includes two computing machines 110, 130 that share access to a block storage device 160. The computing machines 110, 130 include at least a processor (not shown) and local memory that is configured for use as a cache 115, 135. The caches 115, 135 store selected data from the block storage device 160 for direct access by the computing machines 110, 130 (e.g., rather than requesting or storing data in the block storage device). Accessing data in the cache 110, 135, rather than from the block storage device 160, increases the speed of the computing machine's I/O operations. While only two computing machines are shown in FIG. 1, the distributed cache coherency protocol described herein can be used with any number of computing machines. To facilitate cache coherency amongst the machines, a distributed cache coherency protocol is established between caching logics 120, 140 that control the local caching for the computing machines 110, 130 and a block delegation logic 150 that controls access to the block storage device 160.

The distributed cache coherency protocol works through delegations. A delegation is an exclusive caching right that is assigned to an individual caching logic 120, 140 by the block delegation logic 150. The caching right is granted with respect to a range of memory blocks.

In some embodiments, the caching logics 120, 140 are embodied on an SCSI interface card installed in a computing machine. The caching logic may be embodied as an "initiator" in a Microsoft operating system. The block delegation logic 150 may be embodied as part of a controller for the block storage device 160. In some embodiments, the caching right may be with respect to a range of Logical Block Addresses (LBAs) for a Logical Unit Number (LUN) disk created on a Storage Area Network (SAN) (see FIG. 6 for one particular embodiment). A delegation can thus be represented as D (LUN ID, LBA, length, caching logic ID), in which LBA is the starting address of the delegated range and length is the length of the range. The block delegation logic 150 keeps a log of delegations so that the delegations can be persistent across reboots of the computing machines 110, 130.

For the purposes of the following description, the operation of only one computing machine 110, the associated cache 115, and caching logic 120 will be described. The computing machine 130, the associated cache 135, and caching logic 140 operate in a corresponding manner. According to one embodiment of the distributed cache coherency protocol, the caching logic 120 only caches or serves data from the cache 115 that falls within a range of memory blocks for which it has been delegated a caching right by the block delegation logic 150. When the computing machine 110 requests or outputs data that is not already stored in the cache 115, the cache 115 will typically retrieve the data from the block storage device 160 and store it in the cache 115 for future access by the computing machine 110. Using the distributed cache coherency protocol, before storing data in the cache 115 from the block storage device 160 or providing data to the computing machine 110 from the cache, the cache 115 will determine whether it has a caching right for the data. If the cache 115 does not have a caching right to the data, the data is not stored in the cache 115. If the data is already in the cache 115, the cache 115 will not provide the data to the computing machine 110 because another cache may have a caching right that is allowing conflicting data to exist between caches.

The caching logic 120 serves I/O requests by the computing machine 110 that are outside of the caching logic's delegated caching rights from the block storage device 160. The block delegation logic 150 monitors which memory blocks in the block storage device 160 are being accessed by the computing machine 110 and may assign a caching right to the caching logic 120 for the accessed blocks, as will be discussed in more detail below. The computing machines 110, 130 use data in the caches 115, 135 to perform operations without having to fetch the data from the block storage device 160.

The block delegation logic 150 controls access to the block storage device 160 so that only a caching logic that holds a delegation is allowed to issue write I/O to the range of memory blocks in the delegation. Caching logics may be allowed to issue read I/O to ranges of memory blocks for which a delegation is not held. If a caching logic issues write I/O to a memory block or blocks for which a caching right has been granted to another caching logic, the block delegation logic 150 will either reject the write I/O with an error or first revoke the conflicting delegation before completing the write I/O.

According to one embodiment of the distributed cache coherency protocol, the block delegation logic 150 is responsible for managing delegations. The block delegation logic 150 assigns delegations to the various caching logics based on data access patterns of the caching logics. The block delegation logic 150 is also capable of revoking a delegation or modifying the range of a delegation.

The caching logic 120 begins caching into the cache 115 for a range of memory blocks once the caching logic 120 has been granted a caching right to the memory blocks. Upon revocation of a delegation by the block delegation logic 150, the caching logic 120 ceases relying on data in the cache 115 for the range of memory blocks in the revoked delegation. The caching logic 120 will invalidate the data in the cache 115 so that data in the revoked delegation will no longer be served from the cache. If the caching logic 120 receives a message from the block delegation logic 150 to modify the range of memory blocks in a delegation, the caching logic 120 updates the structure of the cache 115 to reflect the modified delegation and may invalidate data corresponding to data that falls outside of a delegated range that has been diminished.

Figure 2:
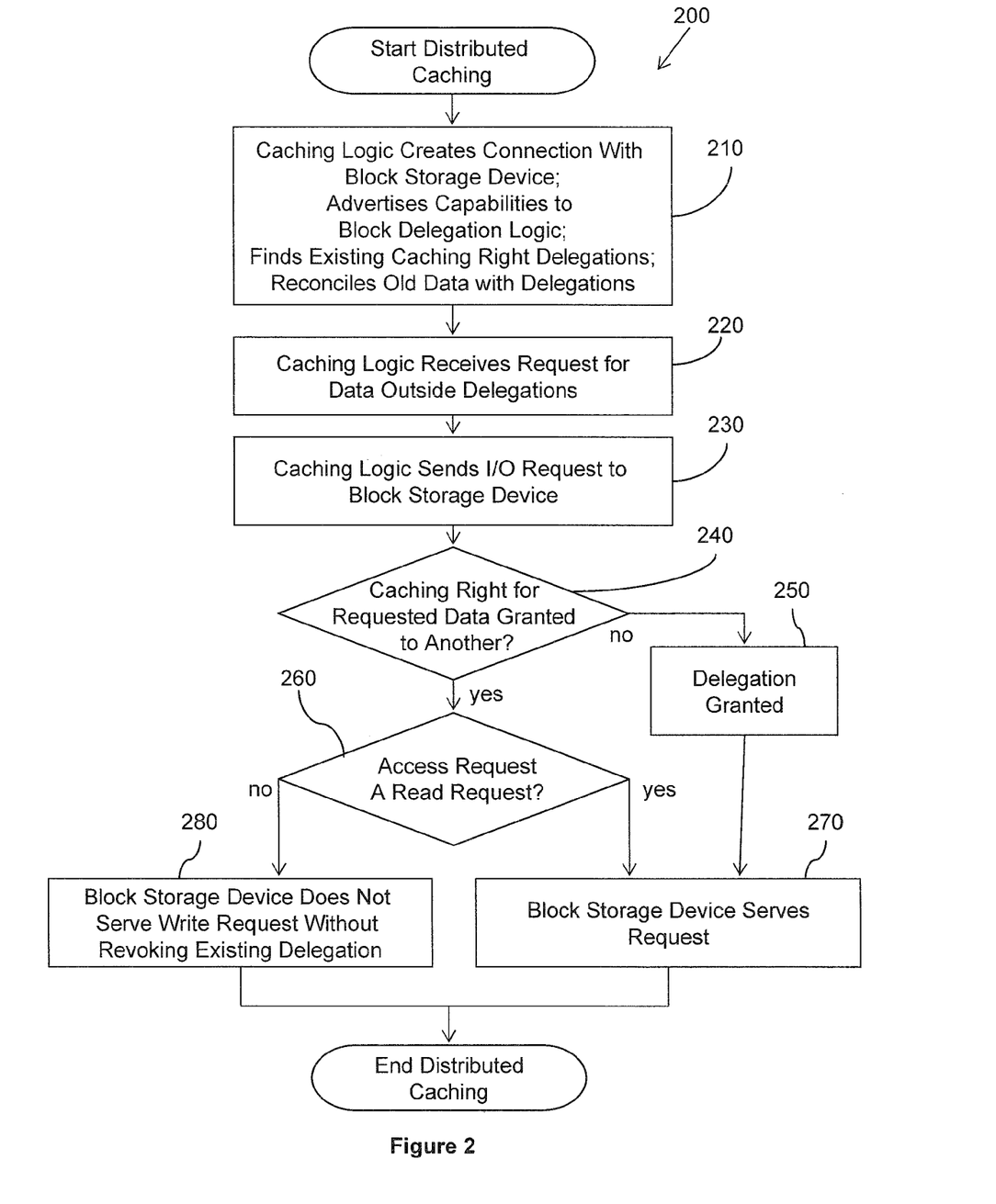
FIG. 2 illustrates one embodiment of a method associated with a distributed cache coherency protocol.

FIG. 2 illustrates one embodiment of a sequence of operations 200 of the caching logic and block delegation logic according to the distributed cache coherency protocol. Before the caching logic performs any caching or serves data from its cache, the caching logic performs the operations shown at 210. The caching logic creates a TCP connection to the well-defined port on the block storage device for the out-of-band protocol. After the connection is established, the caching logic does a protocol handshake to determine the latest common protocol version. The caching logic advertises its capabilities to the block delegation logic. Next, the caching logic queries the block delegation logic to find existing delegations that have been assigned to the caching logic. It records these delegations and begins caching right away in the ranges of memory blocks specified by the delegations. The cache may already contain some data. The caching logic reconciles the data in the cache with the delegations received from the block delegation logic.

At 220, the caching logic receives an I/O request for data outside of its delegations. At 230, the caching logic sends the I/O request to the block storage device. At 240, the block delegation logic determines if any delegations of caching rights for the requested data have been granted. At 250, if no delegations have been granted, the block delegation logic assigns a delegation to the caching logic that requested access. After receiving the delegation, the caching logic can start caching data for the assigned range of memory blocks.

If a delegation of any memory blocks that contain requested data has been granted and if, at 260, it is determined that the I/O request is a read request, at 270 the block storage device will serve the read request without assigning a new delegation to the caching logic. If the I/O request is a write request, at 280 the block storage device will not serve the request without revoking the existing delegation. In this case, there are two possible outcomes. In one outcome, the block storage device, as controlled by the block delegation logic, rejects the I/O request with an error. In the other outcome the block delegation logic revokes the existing delegation and serves the write request. The block delegation logic may then opt to assign a new delegation to the caching logic that just performed the write operation.

Figure 3:
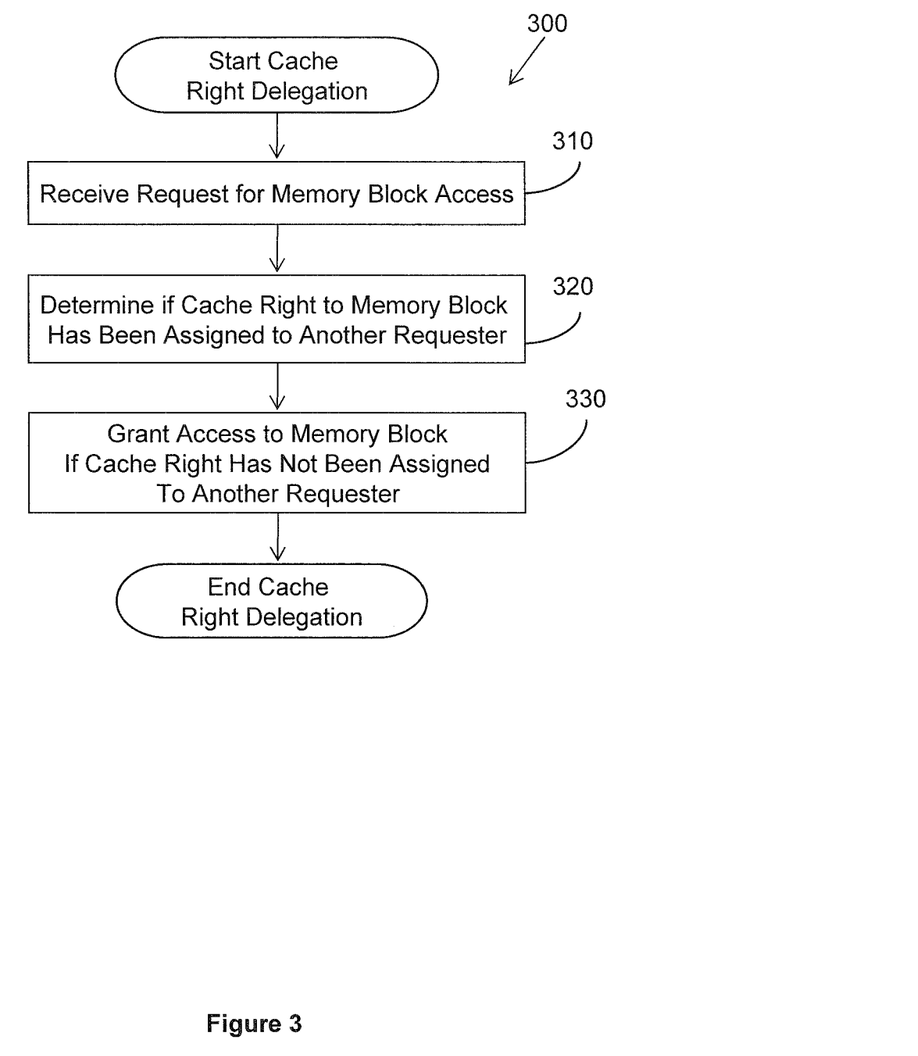
FIG. 3 illustrates one embodiment of a method associated with a distributed cache coherency protocol.

FIG. 3 illustrates one embodiment of a cache right delegation method 300 that is performed in practice of the distributed cache coherency protocol. In some embodiments, the method 300 is performed by the block delegation logic 150. At 310, a request is received for access (either read or write access) to one or more memory blocks in a shared block storage device. At 320, a determination is made as to whether a caching right to any of the one or more memory blocks has been granted to a different requester. At 330, if the caching right has not been granted to a different requester, the request for access to the memory blocks is granted.

Figure 4:
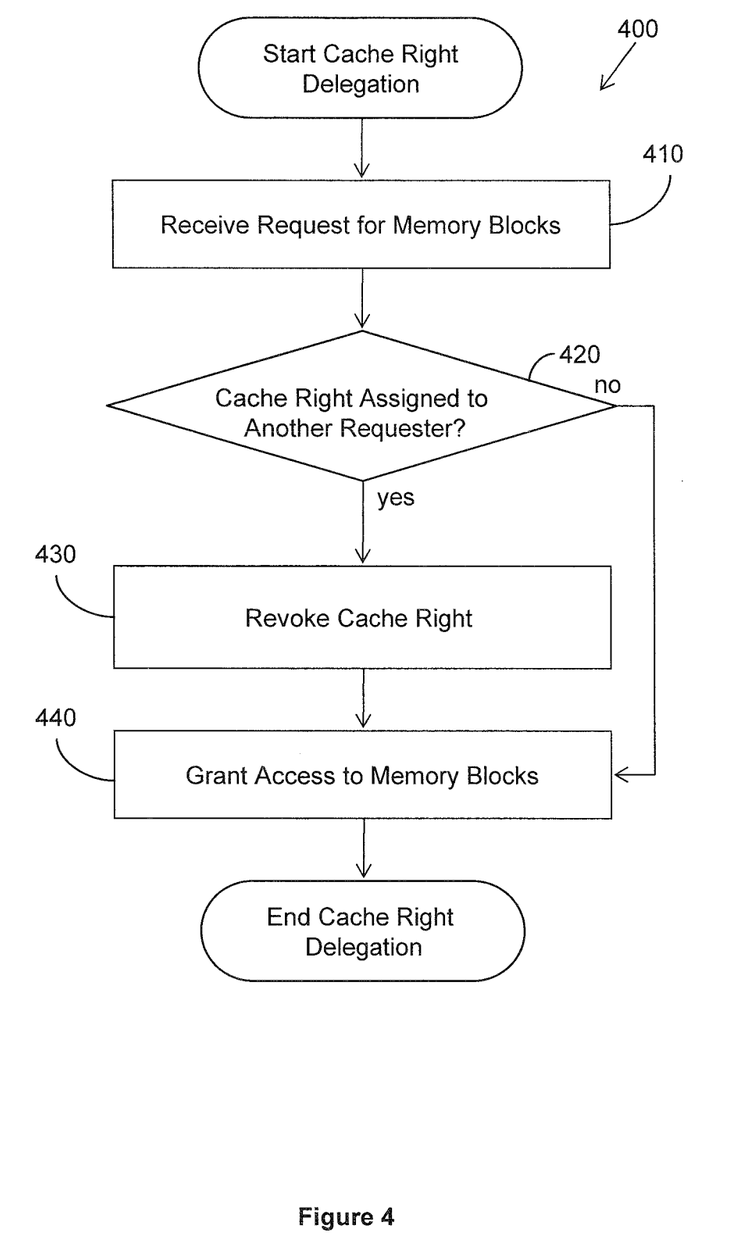
FIG. 4 illustrates one embodiment of a method associated with a distributed cache coherency protocol.

FIG. 4 illustrates one embodiment of a cache right delegation method 400 that is performed in practice of the distributed cache coherency protocol. The method 400 illustrates one possible outcome when memory blocks in a block storage device are requested by a computing machine and another computing machine holds the caching rights to the memory blocks. In some embodiments, the method 400 is performed by the block delegation logic 150. At 410, a request is received for access (read or write access) to one or more memory blocks in a shared block storage device. At 420, a determination is made as to whether a caching right to any of the one or more memory blocks has been granted to a different requester. If the caching right has not been granted to a different requester, at 440 the request for access to the memory blocks is granted. If the caching right has been granted to a different requester, at 430 the caching right is revoked and at 440 the request for access to the memory blocks is granted.

Figure 5:
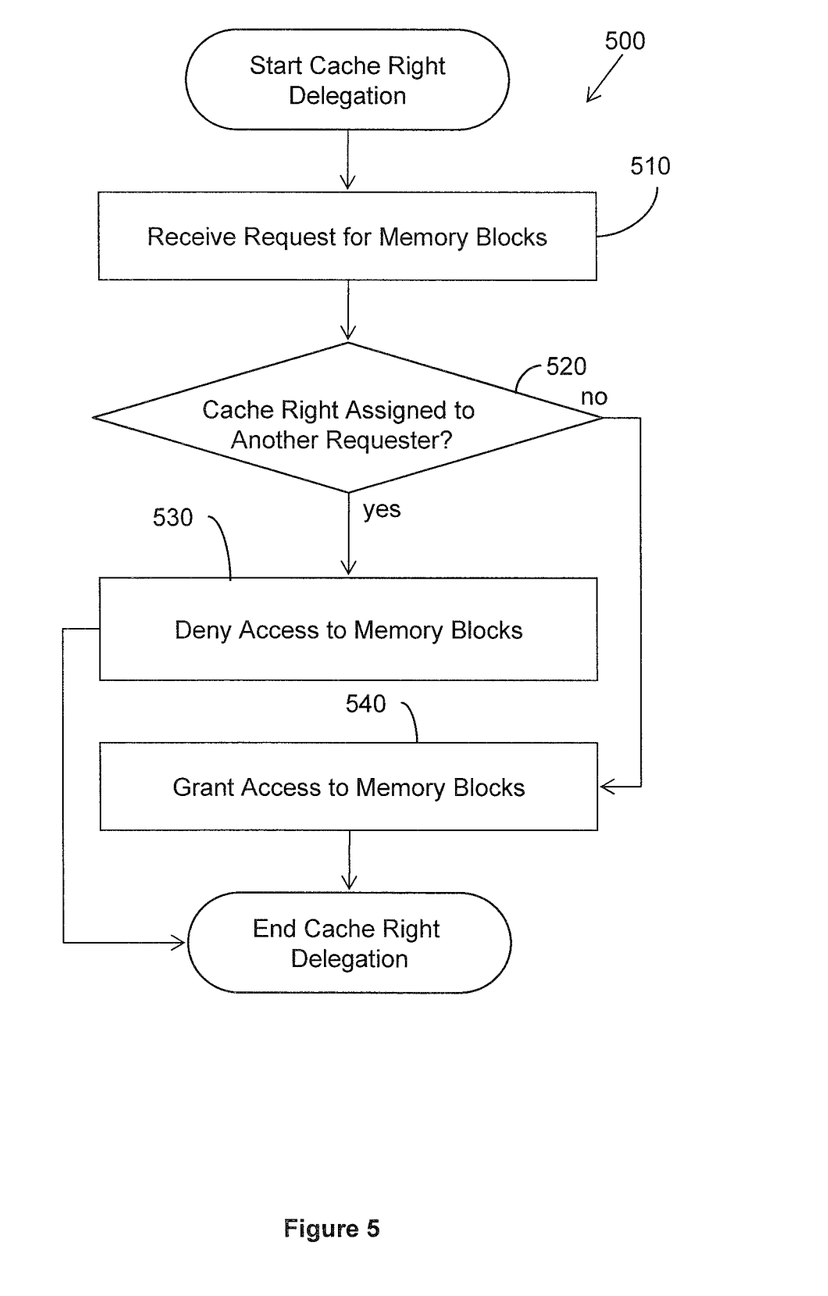
FIG. 5 illustrates one embodiment of a method associated with a distributed cache coherency protocol.

FIG. 5 illustrates one embodiment of a cache right delegation method 500 that is performed in practice of the distributed cache coherency protocol. The method 500 illustrates one possible outcome when memory blocks in a block storage device are requested by a computing machine and another computing machine holds the caching rights to the memory blocks. In some embodiments, the method 500 is performed by the block delegation logic 150. At 510, a request is received for access (read or write access) to one or more memory blocks in a shared block storage device. At 520, a determination is made as to whether a caching right to any of the one or more memory blocks has been granted to a different requester. If the caching right has been granted to a different requester, at 530, access to the memory blocks is denied. If the caching right has not been granted to a different requester, at 540 the request for access to the memory blocks is granted.

Figure 6:
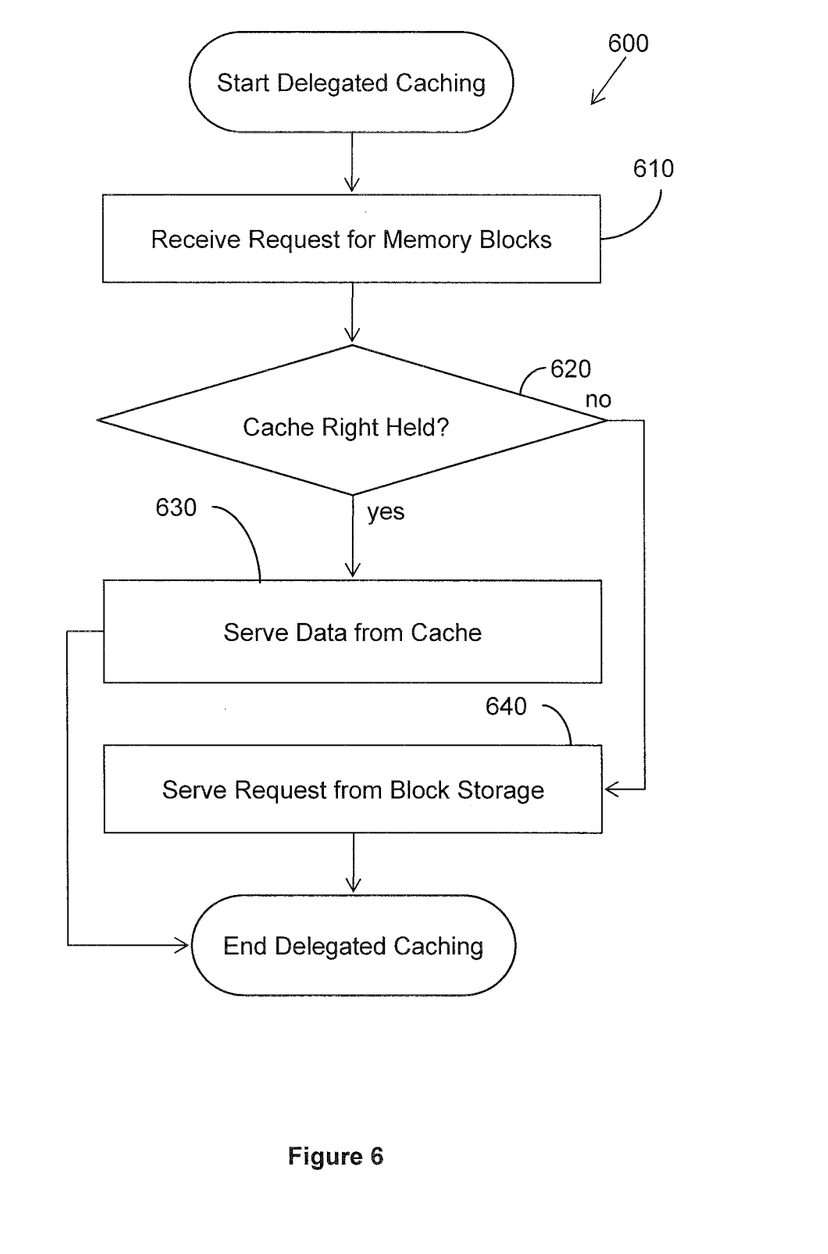
FIG. 6 illustrates one embodiment of a method associated with a distributed cache coherency protocol.
Figure 7:
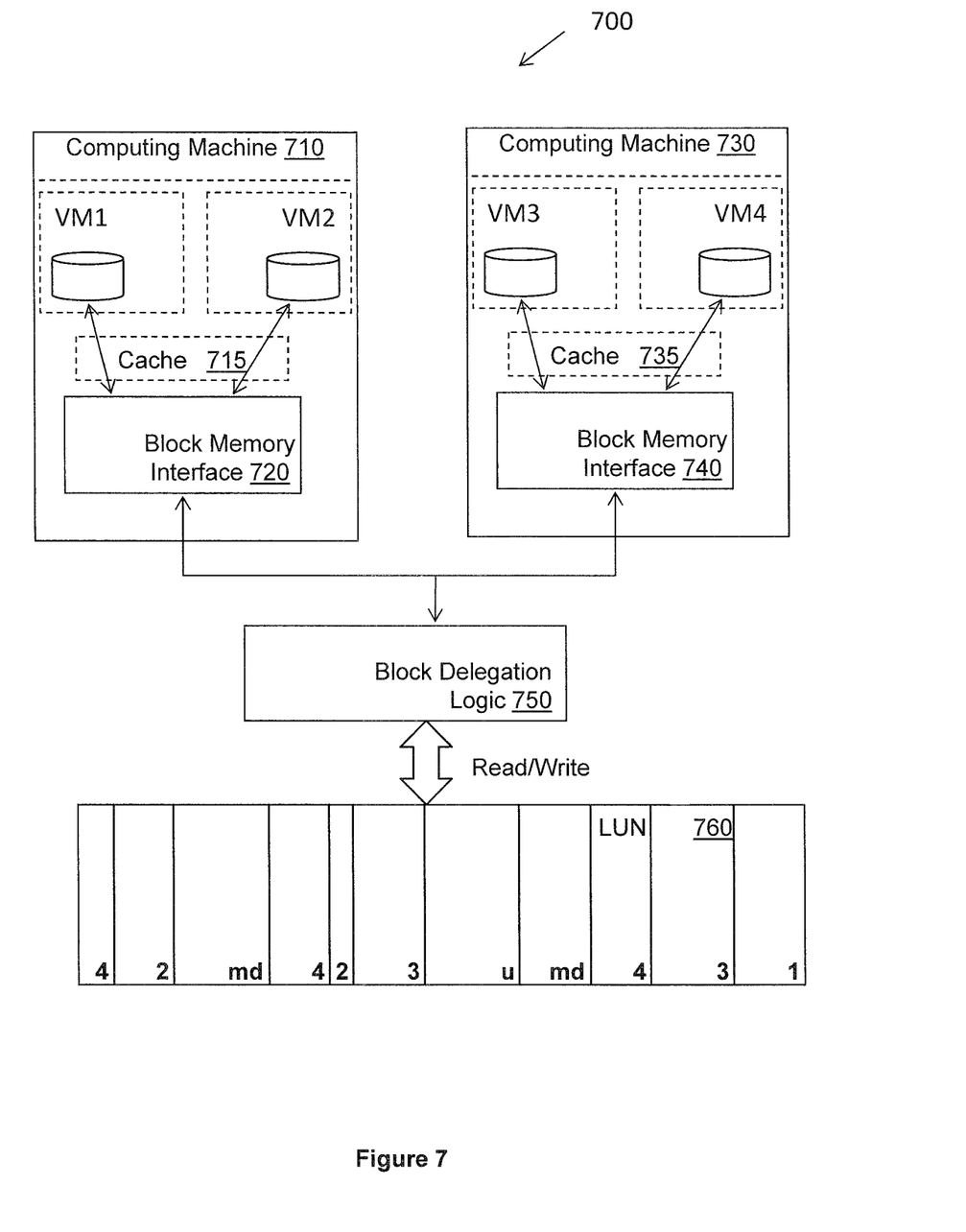
FIG. 7 illustrates one embodiment of a system associated with a distributed cache coherency protocol device.

FIG. 6 illustrates one embodiment of a delegated caching method 600 that is performed by a caching logic in practice of the distributed cache coherency protocol. The method 600 is performed by a caching logic as opposed to the methods 300, 400, 500, which are performed by a block delegation logic 150. In some embodiments, the method 600 is performed by the caching logics 120, 140 (FIG. 1) or a block memory interface device 720, 740 (FIG. 7). At 610, a request is received for access (read or write access) to one or more memory blocks in a shared block storage device. At 620, a determination is made as to whether a caching right to the memory blocks is currently held by the receiver of the request. If the caching right is held by the receiver of the request, at 630 the data is served from cache. If the caching right is not held by the receiver of the request, at 640 the request is served from the block storage device. Cache coherency is maintained because according to the method 600, a caching logic will only store data in or serve data from a cache holding a caching right to the data. Thus only one cache may be caching any given block of data and another cache cannot be modifying the same data.

In one embodiment, the protocol is established by way of out-of-band (outside the data path) communication between the caching logic (120, FIG. 1) and the block delegation logic (150, FIG. 1). The protocol is performed over TCP/IP. The block delegation logic listens on a pre-defined, well-known, port on the block storage device (160, FIG. 1). The caching logic is responsible for establishing a connection with the block delegation logic and the caching logic should not perform any caching until the protocol has been established. After the connection is established, the caching logic performs a protocol handshake with the block delegation logic to establish the latest common version which both the caching logic and block delegation logic support.

The block delegation logic supports a query interface by which the caching logic may query the block delegation logic for all existing delegations that have been assigned to the caching logic. This interface is used, for example, after reboot of a computing machine because delegations are persistent. The block delegation logic may also support an interface by which the caching logic may advertise its capabilities. For example, the caching logic may communicate the types of caching (e.g., READ-CACHE, WRITE-THRU, WRITE-BACK) that are supported, the size of the available cache, or the maximum number of delegations that can be handled per block storage device or as a whole. The block delegation logic may also support a start/stop caching interface that is used by the caching logic to inform the block delegation logic that it has started or stopped caching so that the block delegation logic will not send delegations if caching is not being performed by the caching logic.

The caching logic provides an interface through which the block delegation logic may assign delegations, revoke delegations, modify existing delegations, and invalidate a range of memory blocks in the cache. An information/debugging interface may also be provided by the caching logic.

In some circumstances, a caching logic may issue a SCSI PERSISTENT RESERVATION request to the block storage device. As will be described in more detail below, this request is performed to allow updating of metadata that is necessary when virtual machines are created or moved between physical machines. Following the request, the caching logic typically will perform several write I/O requests, which can be handled by the block delegation logic in at least two different ways. The block delegation logic can revoke all existing delegations for all caching logics other than the caching logic that issued the PERSISTENT RESERVATION. In this case, all of the caching logics would invalidate the data in their caches. Alternatively, the block delegation logic can send out an invalidation request to the caching logic that has a delegation for the memory blocks being written to during the PERSISTENT RESERVATION. This approach keeps the impact of PERSISTENT RESERVATION relatively low. Once the issuer of the PERSISTENT RESERVATION does an unreserve operation, the caching can continue where it left off.

The distributed cache coherency protocol can be enhanced to support write-back style caching wherein individual local caches can hold dirty data that has not been synchronized with the block storage device. This can be achieved by adding another type of delegation called a mutually exclusive delegation. This type of delegation will allow only a single reader or writer of any given memory block. Thus, only caching logics with a delegation for a memory block may read or write to the memory block in the block storage device. With this type of delegation, if the block delegation logic receives an I/O request from a caching logic that does not hold a delegation of caching rights to the requested blocks, the block delegation logic will determine if another caching logic holds the delegation. If no other caching logic holds the delegation, then the block delegation logic assigns the delegation to the requesting caching logic prior to serving the I/O request. If another caching logic holds the delegation, then the block delegation logic either returns an I/O error or revokes or modifies the delegation to the other caching logic and assigns the delegation to the requesting caching logic prior to serving the I/O request.

FIG. 7 illustrates one embodiment of a clustered virtualization environment 700 associated with a distributed cache coherency protocol. In the virtualization environment 700, there are two physical computing machines 710, 730. The physical computing machine 710 acts as a host machine for virtual machines 1 and 2, while the machine 730 acts as host for virtual machines 3 and 4. A shared LUN 760 is exported to both machines 710, 730. The computing machine 710 acts as metadata master in this virtualization environment. The metadata master formats the LUN 760 with a cluster file system. The metadata master is responsible for metadata modification to the cluster file system.

Each virtual machine creates its own virtual disk as a file on the LUN 760. The virtual disk files for each machine are labeled with a corresponding number in the LUN 760 ("md" indicates metadata while "u" indicates unallocated blocks). After the metadata master has created the virtual disk files, the individual virtual machines retain complete ownership of these files. However, any changes related to the metadata of the cluster file system (e.g., addition/deletion/expansion of virtual disks) are handled by the metadata master (i.e., machine 710). Each computing machine 710, 730 includes a cache 715, 735 that is controlled by a block memory interface 720, 740. The block memory interfaces 720, 740 coordinate cache operations with a block delegation logic 750. The block memory interfaces are devices that perform similar operations as those described above in connection with caching logics, as described above with respect to FIGS. 1 and 6, and as follows.

In a steady state read/write scenario, each virtual machine accesses its respective memory blocks in the LUN 760. Under the distributed cache coherency protocol described herein, the block delegation logic 750 will identify the ranges of blocks being accessed by each block memory interface 720, 740 and will assign appropriate delegations to the accessed blocks to the block memory interfaces.

If virtual machine 1 moves from computing machine 710 to computing machine 730, the metadata master (computing machine 710) will issue a PERSISTENT RESERVATION to reserve the LUN 760 so that the metadata can be updated. While the PERSISTENT RESERVATION is in effect, the block delegation logic 750 will send delegation revocations to computing machine 730 for the blocks that are written by the metadata master. The blocks being written should mostly be metadata, causing the computing machine 730 to re-read the uploaded metadata from the LUN when it needs it. Once virtual machine 1 is operational from computing machine 730, the block memory interface 740 will access the virtual disk file for virtual machine 1. Recall that a caching right to these blocks are still held by the block memory interface 720. The block delegation logic 750 will revoke or modify the caching rights assigned to the block memory interface 720 and assign new caching right delegations to the block memory interface 740. Because only a single block memory interface is allowed to have a caching right to specific memory blocks in the LUN 760, computing machine 730 will not serve incorrect data to applications running on computing machine 710.

If the computing machine 710 creates a new virtual machine, it will issue a PERSISTENT RESERVATION request to reserve the LUN 760, update the metadata to create a new virtual disk file and assign it block ranges from the unallocated blocks. While the PERSISTENT RESERVATION is in effect, the block delegation logic 750 will send delegation revocations to computing machine 730 for the blocks that are written by the metadata master. The blocks being written should mostly be metadata, causing the computing machine 730 to re-read the uploaded metadata from the LUN when it needs it. Once the computing machine 710 is finished updating the metadata and removes the reservation, the virtual machine can start reading and writing to its virtual disk file on the LUN 760. The block delegation logic 750 will assign new caching right delegations to the block memory interface 720 on the computing machine 710 that hosts the new virtual machine.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   non-transitory storage media configured as a cache associated with a physical computing machine that shares access to a block storage device with at least one other physical computing machine;
   a caching logic associated with the physical computing machine, the caching logic configured to cache data in the cache, wherein the caching logic caches data stored in a delegated range of memory blocks and does not cache data stored outside of the delegated range of memory blocks;
   a block delegation logic configured to:
   determine whether a virtual machine has moved to the physical computing machine from the at least one other physical computing machine;
   revoke a caching right associated with the at least one other physical computing machine upon a determination that the virtual machine has moved to the physical computing machine, wherein the caching right is an exclusive right granted to the caching logic;
   assign, to the physical computing machine, a new caching right for the delegated range of memory blocks in the block storage device to the caching logic.

2. The apparatus of claim 1, wherein each physical computing machine with access to the block storage device comprises a respective block delegation logic associated with the block storage device and a caching logic.

3. The apparatus of claim 1, wherein the caching logic is configured to serve an I/O request • from the physical machine for data stored outside of the delegated range by accessing the data from the block storage device without caching the data.

4. The apparatus of claim 1, wherein the block delegation logic is configured to deny a request from a first caching logic for write access to blocks of data in the block storage device that are part of a delegated range assigned to a second caching logic.

5. The apparatus of claim 1, wherein the caching logic is configured to invalidate the data in the cache upon receiving a revocation of the caching right from the block delegation logic.

6. The apparatus of claim 1, wherein the block delegation logic is configured to assign a caching right for a requested range of memory blocks to a caching logic requesting access to the requested range of memory blocks if no other caching logic has the caching right to any memory blocks in the requested range of memory blocks.

7. The apparatus of claim 1, wherein the block delegation logic is configured to deny access to memory blocks in the block storage device to a caching logic that does not have a caching right to the memory blocks.

8. A method, comprising:
   receiving a request from a requester for access to one or more memory blocks in a block storage device that is shared by at least two physical computing machines;
   determining whether the requester is a virtual machine that has moved between the at least two physical computing machines;
   determining if a caching right to any of the one or more memory blocks has been granted to a different requester;
   if the caching right has not been granted to the different requester, granting access to the one or more memory blocks to the requester, and
   if the caching right has been granted to the different requester and if the requester is a virtual machine that has moved between the at least two physical computing machines, revoking the caching right.

9. The method of claim 8, further comprising if the caching right has not been granted to the different requester, granting the caching right to the requester for a range of memory blocks that include the requested memory blocks.

10. The method of claim 8, further comprising if the caching right has been granted to the different requester, revoking the caching right of the different requester prior to granting access to the one or more memory blocks to the requester.

11. The method of claim 8, further comprising if the caching right has been granted to the different requester, denying the requester access to the one or more memory blocks.

12. The method of claim 8, further comprising saving a record of caching rights granted to requesters such that upon reboot of a requester, the requester may be provided with an identification of the caching rights presently held by the requester.

13. The method of claim 8, further comprising receiving a persistent reservation for the one or more blocks of memory from a first requester and preventing access to the block storage device to different requesters while the first requester accesses the block storage device.

14. The method of claim 13, further comprising, in response to receiving the persistent reservation, revoking all caching rights granted to all requesters prior to allowing the first requester to access the block storage device.

15. The method of claim 13, further comprising, for every write performed by the first requester on a given memory block during the persistent reservation, revoking a caching right to a range of memory blocks that includes the given memory block.

16. A block memory interface configured for coupling to a physical computing machine, wherein the block memory interface is further configured to:
    receive, from the physical machine, a request for access to data stored in a block memory device accessible to at least one other physical computing machine;
    determine if a caching right to a range of memory blocks that includes the requested one or more memory blocks has been assigned to the block memory interface;
    determine whether the request was sent from a virtual machine that has moved to the physical machine from the at least one other physical computing machine;
    if the caching right has been assigned to the block memory interface, provide access to the data in a cache;
    further where the caching right is an exclusive right for the physical computing machine to cache a range of memory blocks in the block memory device, and
    if the caching right has been granted to the different requester and if the requester is a virtual machine that has moved between the at least two physical computing machines, revoking the caching right.

17. The device of claim 16, wherein the block memory interface is further configured to, prior to performing caching operations, perform the following:
    establish an out-of-band connection with the block memory device;
    advertise the block memory interface caching capabilities to the block memory device; and
    query the block memory device for existing caching rights that have been assigned to the block memory interface.

18. The device of claim 17 wherein the block memory interface is further configured to reconcile data present in the cache with caching rights identified in a response to the query for existing caching rights.

19. The device of claim 16 wherein first and second instances of an operating system are running on the physical machine, and wherein the first and second instances of the operating system access first and second files, respectively, each file corresponding to a set of memory blocks, and further wherein the block memory interface performs caching operations without determining which of the memory blocks stored in the cache correspond to the first and second files.

20. The device of claim 16 wherein the block memory interface is further configured to:
    receive a revocation of a caching right to a revoked range of memory blocks; and
    invalidate data stored in the cache that corresponds to the revoked range of memory blocks.

21. The apparatus of claim 1, further wherein the physical computing machine issues a persistent reservation to reserve the block storage device when the at least one virtual machine moves to the at least one other physical computing machine.

\* \* \* \* \*